US006455842B1

(12) United States Patent
Pouteau et al.

(10) Patent No.: US 6,455,842 B1
(45) Date of Patent: Sep. 24, 2002

(54) MICROMONOCHROMATOR AND METHOD FOR PRODUCING SAME

(75) Inventors: Patrick Pouteau, Voreppe; Pierre Labeye; Gilles Grand, both of Grenoble, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/463,715

(22) PCT Filed: Jul. 30, 1998

(86) PCT No.: PCT/FR98/01701

§ 371 (c)(1),
(2), (4) Date: Jul. 3, 2000

(87) PCT Pub. No.: WO99/06806

PCT Pub. Date: Feb. 11, 1999

(30) Foreign Application Priority Data

Jul. 31, 1997 (FR) .............................................. 97 09797

(51) Int. Cl.$^7$ ................................................ H01I 37/256
(52) U.S. Cl. ...................... 250/227.18; 356/328; 385/14
(58) Field of Search .................... 250/227.18, 227.16; 359/128, 130; 385/14, 37, 129–132; 356/331, 334, 328, 326, 332

(56) References Cited

U.S. PATENT DOCUMENTS

| 4,274,706 A | * | 6/1981 | Tangonan ................... 359/130 |
| 4,387,955 A | | 6/1983 | Ludman et al. |
| 4,786,133 A | | 11/1988 | Gidon et al. |
| 5,078,514 A | * | 1/1992 | Valette et al. .................. 385/16 |

FOREIGN PATENT DOCUMENTS

| DE | 196 02 584 | 1/1996 |
| DE | 196 02 584 | 11/1996 |
| EP | 0 393 372 | 3/1990 |
| FR | 2 609 180 | 12/1984 |
| FR | 2 609 180 | 12/1986 |
| FR | 2 726 905 | 11/1994 |

OTHER PUBLICATIONS

XP 000685236, PHASAR–Based WDM–Devices: Principles, Design and Applications, IEEE Journal of Selected Topics in Quamtum Electronics, vol. 2, No. 2, Jun. 1996, pp. 236–250.
U.S. patent application No. 09/179,133, filed Oct. 26, 1998 (Gilles Grand, Vincent Delisle and Patrick Pouteau).
Applictions of Integrated Optics, Microspectrometersystem Based on Integraed Optic Components In Polymers as Spectral Detection System for the VIS–and NIR Range, C. Muller, O. Fromhein, J. Gottert, T.Kuhner, J. Mohr, pp. 491–494.

* cited by examiner

Primary Examiner—Robert H. Kim
Assistant Examiner—Hoon K. Song
(74) Attorney, Agent, or Firm—Pearne & Gordon LLP

(57) ABSTRACT

A micromonochromator is formed on a substrate and includes a diffraction device (6) associated with an entry that includes at least one entry point and an exit that includes at least one exit point. A mobile arrangement of light guidance (2-20, 4-26) is associated with the entry or the exit or both, and a recovery device (23) is provided by the exit. The mobile arrangement includes at least one mobile beam integrated in the substrate and equipped with at least one light guide. The mobile beam is able to sweep the entry and/or exit in a continuous manner.

14 Claims, 4 Drawing Sheets

MICROMONOCHROMATOR AND METHOD FOR PRODUCING SAME

FIELD OF THE INVENTION

This invention concerns a micromonochromator and a process for making it.

It is applied in particular to:

wavelength multiplexing and demultiplexing in the field of optical telecommunications, and spectrometry.

STATE OF THE ART

It is known that a micromonochromator includes means of diffraction associated with at least one entry point and at least one exit point.

These means of diffraction may be made with a diffraction mirror or a microguide network (phase-array) for example.

For spectrometry applications, a micromonochromator is used to measure variations in intensity on several wavelengths by sweeping several wavelengths by the means of diffraction.

To do this, the means of diffraction are turned and/or the exit point associated with a continuous photodetector is swept by a slit.

With regard to known micromonochromators including several entry points and/or several exit points, the following document can be consulted:

Microspectrometer system based on integrated optic components in polymers and spectral detection system for the VIS- and NIR range, C. Muller, O. Fromhein, J. Gottert, T. Kuhner, J. Mohr, Proc. 7th. Eur. Conf. on Int. Opt. (ECIO '95), Th A2, Applications of Integrated Optics, p. 491 to 494.

In the case of multiplexing/demultiplexing or spectrometry, these points are positioned from the outset in a fixed manner, which, particularly in the case of spectrometry, does not allow for continuous measurement.

SUMMARY OF THE INVENTION

The purpose of this invention is to correct these drawbacks.

The micromonochromator, the subject of this invention, allows for continuous sweeping of the wavelength and not just discrete spectral measurement as was the case with the prior art.

This allows for improved spectral resolution of microspectrometers.

In the area of multiplexing, the micromonochromator of this invention has the advantage of allowing for adjustment of the central wavelength of a multiplexer after manufacturing of this micromonochromator.

In addition, during multiplexing this micromonochromator allows for free commutation on the desired transmission channel.

The micromonochromator of this invention is preferably made by any integrated optic technique (in particular for making continuous wavelength micromonochromators and mobile microguides).

Such a technique allows for collective manufacturing of micromonochromator components.

The invention applies to both multimode and monomode guide structures.

Precisely, this invention concerns a micromonochromator formed on a substrate and including means of diffraction associated with an entry including at least one entry point and an exit including at least one exit point, this micromonochromator being characterised in that it also includes:

mobile means for light guidance associated with this entry or this exit or both, the mobile means of light guidance including at least one mobile beam integrated in the substrate and equipped with at least one light guide, this mobile beam being apt to sweep the entry and/or the exit in a continuous manner, and means for recovery to recover the light supplied by this exit.

In the case of multiplexing/demultiplexing, these means of guidance allow for optimisation of the positioning of the various entry/exit points and, in the case of spectrometry, they allow for continuous measurement.

According to a particular mode of manufacturing, the mobile beam is associated with the entry and equipped with a source of light installed directly on this beam.

The means of recovery could include photodetection means to detect the light supplied by the exit or the means of light guidance (which could be fibre optics).

The mobile means of light guidance could include a first mobile means of light guidance associated with the entry of the micromonochromator, and a second mobile means of light guidance associated with the micromonochromator exit, the first and second mobile means of light guidance including respectively at least a first mobile beam integrated in the substrate and equipped with at least a first light guide, this first mobile beam being apt to sweep the entry in a continuous manner, and at least a second mobile beam integrated in the substrate and equipped with at least a second light guide, this second mobile beam being apt to sweep the exit in a continuous manner.

This allows for making a multiplexer/demultiplexer apt to recover or transmit information in series or to make a spectrometer having a larger range of measurement than the known spectrometers mentioned above.

According to a first particular mode, the first and second beams are independent of each other. According to a second particular mode, the first and second beams are rigidly attached to each other.

According to a particular mode for making the micromonochromator of the invention, it includes several mobile beams associated with the entry and/or the exit, these beams being independent of each other at the entry and the exit respectively.

According to another particular mode, the micromonochromator includes several mobile beams associated with the entry and/or the exit, these beams being rigidly attached to each other at the entry and exit respectively.

If the means of recovery include means for photodetection intended to detect the light supplied by the exit, these means of photodetection can include means for transferring light and a photodetector arranged facing one end of the means of transfer or simply at least one photodetector.

This photodetector may be placed directly on the mobile beam, which is then associated with the exit.

The means of transfer mentioned above include for example at least a light guide or a fibre optic or a lens.

According to a first particular mode for making the micromonochromator of the invention, the means of diffraction include a mirror with multiple facets also called a "step grading".

The positions of the facets can be calculated by the method described in the following document:

(1) French patent application No. 86 18434 of Dec. 31, 1986 corresponding to EP 0 275 795 A and to U.S. Pat. No. 4,786,133 A.

According to a second particular mode, the means of diffraction include a network of light microguides also called "PHASAR".

The following document may be consulted on this subject:

(2) PHASAR-based WDM-devices: principles, design and applications, Meint K. Smit and Cor van Dam, IEEE Journal of selected topics in quantum electronics, vol. 2, no. 2, June 1996, p. 236 to 250.

The present invention also concerns a process for manufacturing the micromonochromator of the invention, characterised in that the means of diffraction and the mobile means of light guidance are manufactured by an integrated optic technique.

Advantageously, they are manufactured collectively by this integrated optic technique.

BRIEF DESCRIPTION OF THE DRAWINGS

The present invention will be better understood with a reading of the description of the embodiment examples given below, which are purely indicative and in no way limiting, with reference to the drawings in appendix, in which.

DETAILED DESCRIPTION OF PARTICULAR EMBODIMENTS OF THE INVENTION

It should first be specified that the micromonochromators according to the invention which are schematically represented in FIGS. 2 to 6 are made by an integrated optic technique allowing for collective manufacturing of all of the components of each micromonochromator and that the optic adjustment of each of them (positing of the beam or beams which it includes) is done by the manufacturing process itself.

For manufacturing of the means of diffraction in the case of FIGS. 2 to 5 where these means of diffraction are composed of a multiple-facet mirror, the aforementioned document (1) can be consulted.

Figure 6:
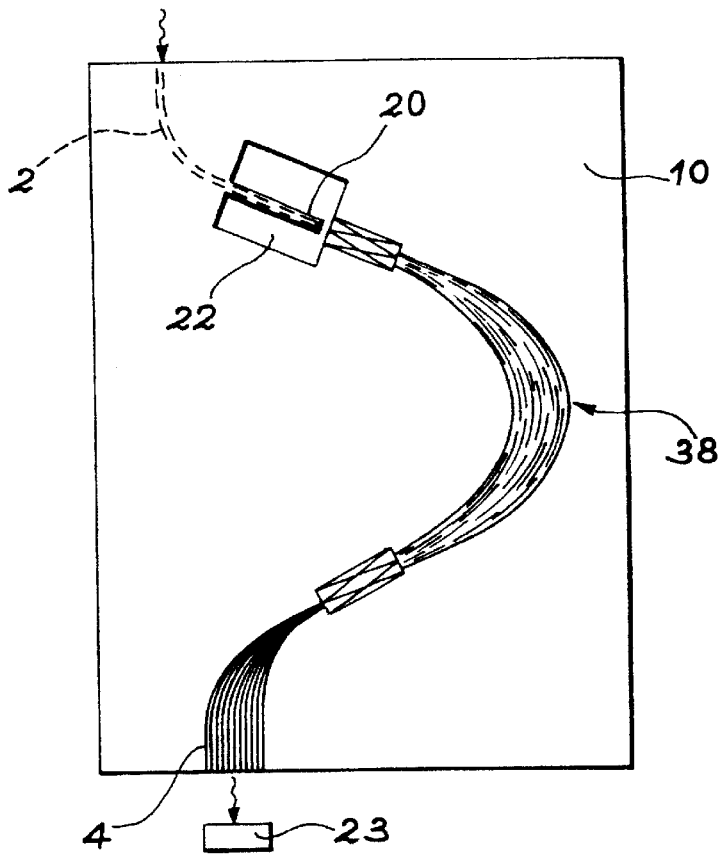
FIG. 6 is an overhead schematic view of another micromonochromator according to the invention, including a mobile beam at its entry and means of diffraction composed of a microguide network.

For manufacturing of the means of diffraction represented on FIG. 6 where these means are composed of a microguide network, document (2) can be consulted.

With regard to manufacturing of each of the mobile beams equipped with a light guide, the following document can be referred to:

(3) TR 2 660 444 A corresponding to EP 0 451 018 A and to U.S. Pat. No. 5,078,514 A.

In an embodiment mode which is not shown, the mobile beams can be equipped with small mechanical radius rods.

The following document may be consulted for this subject:

(4) French patent application No. 94 13559 of Nov. 10, 1994 (FR 2 726 905 A) corresponding to EP 0 712 004 A.

Figure 3:
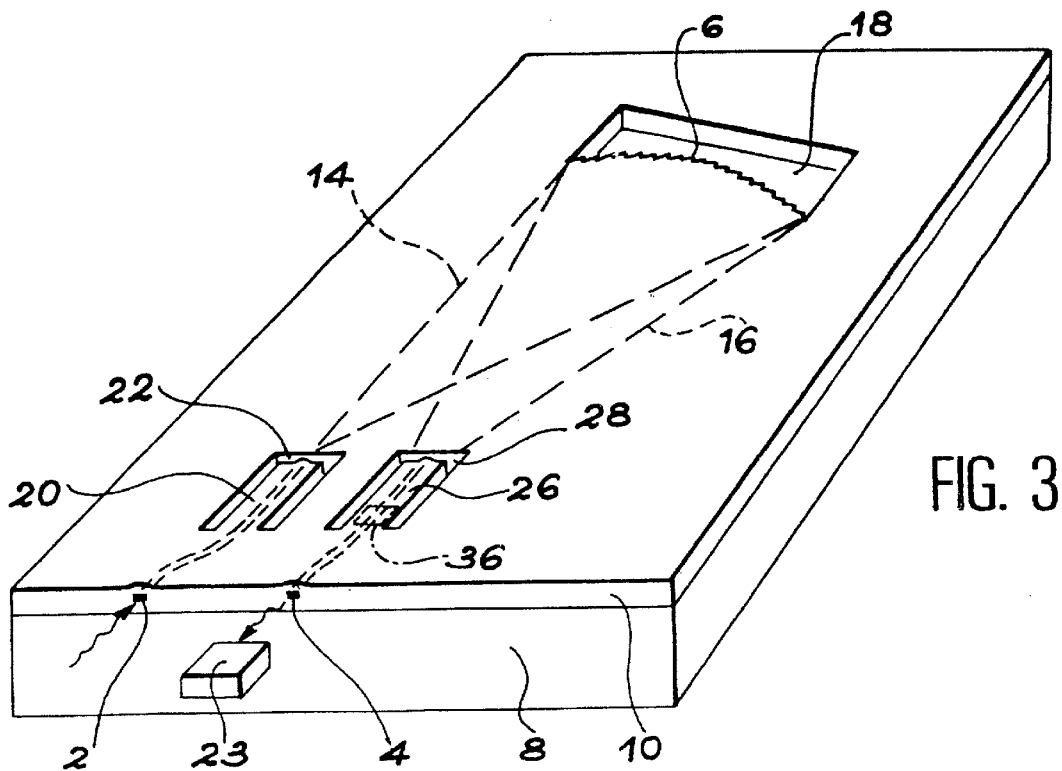
FIG. 3 is a schematic perspective view of a micromonochromator according to the invention, including a mobile beam at its entry and a mobile beam at its exit, these beams each supporting a microguide.
Figure 4:
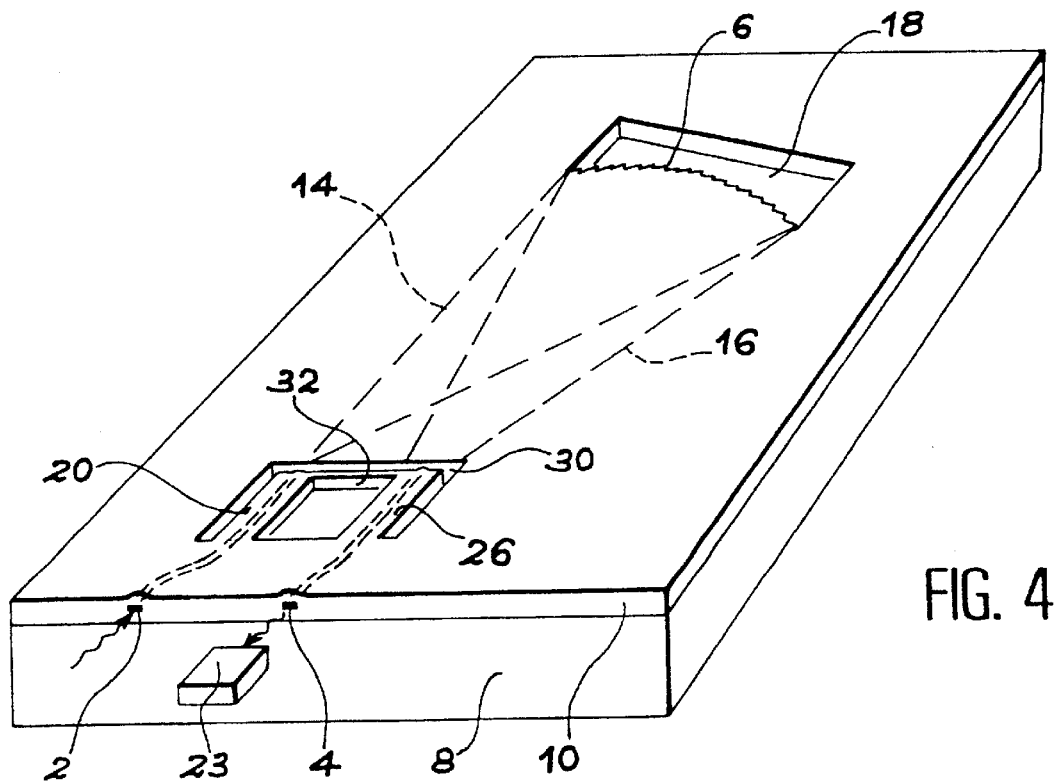
FIG. 4 is a schematic perspective view of a micromonochromator according to the invention, including a mobile beam at its entry and a mobile beam at its exit, these mobile beams each supporting a microguide and being linked to each other.

When a micromonochromator according to the invention includes a beam at its entry and a beam at its exit, these two beams can be moved simultaneously if there is a linking rod between the two beams as shown in FIG. 4, or they can be moved independently of each other as is the case in FIG. 3.

The case of a wavelength multiplexer/demultiplexer will now be considered.

For wavelength demultiplexing, the positioning of a mobile beam with the entry guide for the means of diffraction, according to the invention, makes it possible to compensate, after manufacturing, for any drift in wavelength of the demultiplexer (variation in absolute index targeted for example).

The position of the exit wavelengths of the demultiplexer depends on the shape of the optic component used for the diffraction but also depends on the absolute optic index of the layers made.

The distance between the exit wavelengths varies little as a function of the index of refraction of the optic layer.

The position of the exit wavelengths is however very sensitive to variation of this refraction index.

This variation can be compensated by a modification of the position of the entry guide of the means of diffraction.

The calculations in document (1) mentioned above may be consulted on this subject.

A modification of the position of the entry guide modifies the position of the exit wavelengths.

This explains the importance of the entry mobile beam.

In addition, making a mobile beam facing the entry to the means of diffraction requires leaving a space free between this mobile beam and this entry.

This free space can be used to introduce any appropriate optic to improve the performance of the wavelength demultiplexer.

Microlenses or phase shifting plates or anti-reflection layers or an index liquid may be inserted in this free space for example.

The preceding reasoning is the same in the case of a multiplexer.

In this case, the mobile beam is located at the exit from the means of diffraction.

The case of a spectrometer will now be considered.

According to the invention, the card of photodetectors used for detection in the known spectrometer (see the document Microspectrometer system based on integrated optic components in polymers as spectral detection system for the VIS- and NIR Range already cited) is replaced with a mobile beam with an optic guide and a photodetector at the end of the optic guide or a photodetector positioned directly on this mobile beam.

This allows for continuous detection of the spectrum to be measured, the resolution no longer limited by the dimensions of the photodetectors used in the prior art.

As was seen above, movement of the entry guide (or exit guide) of the means of diffraction of a micromonochromator according to the invention allows for movement of the exit (or entry) wavelengths of the demultiplexer (or multiplexer) using this micromonochromator.

In the case of the spectrometer, the whole spectrum is shifted.

In some cases this can improve the measurement range of the spectrometer, particularly if the entry and exit beams are associated with means of diffraction and are linked to each other.

Figure 5:
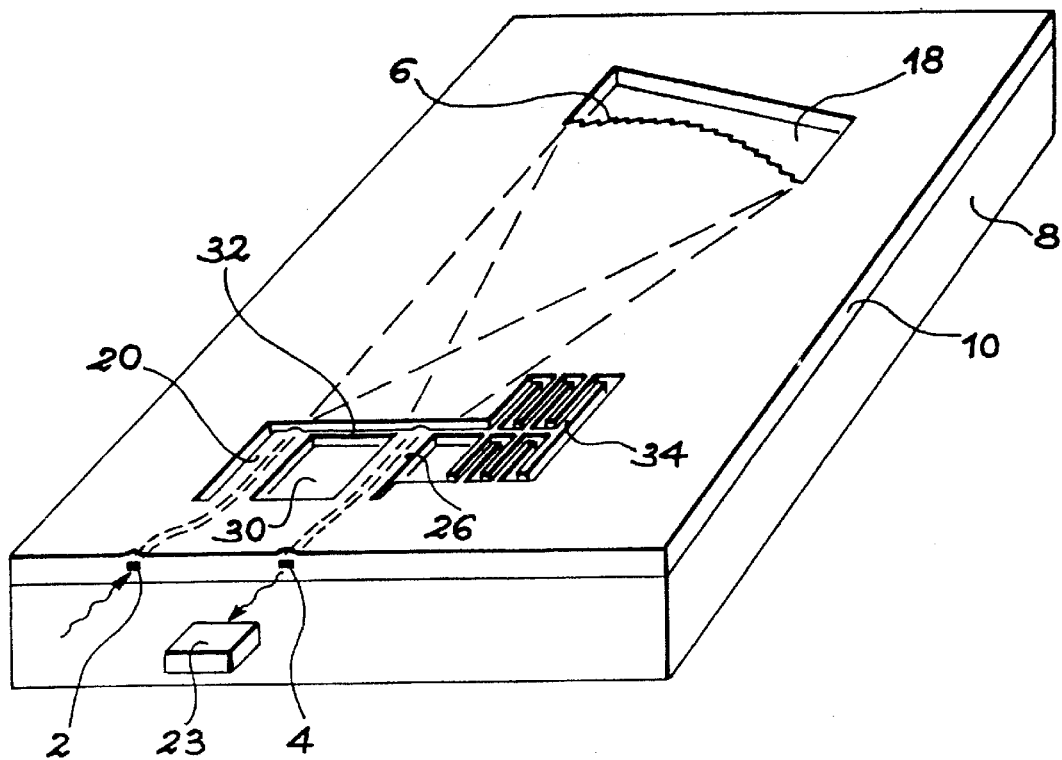
FIG. 5 is a schematic perspective view of a micromonochromator according to the invention, arranged in the same way as that in FIG. 4 but including in addition an electrostatic control comb for the mobile beams.

In this case, when the entry and exit channels of the micromonochromator are close to each other on the same side of this micromonochromator, a single control device for the entry and exit beams can be made as is shown schematically in FIG. 5.

Figure 1:
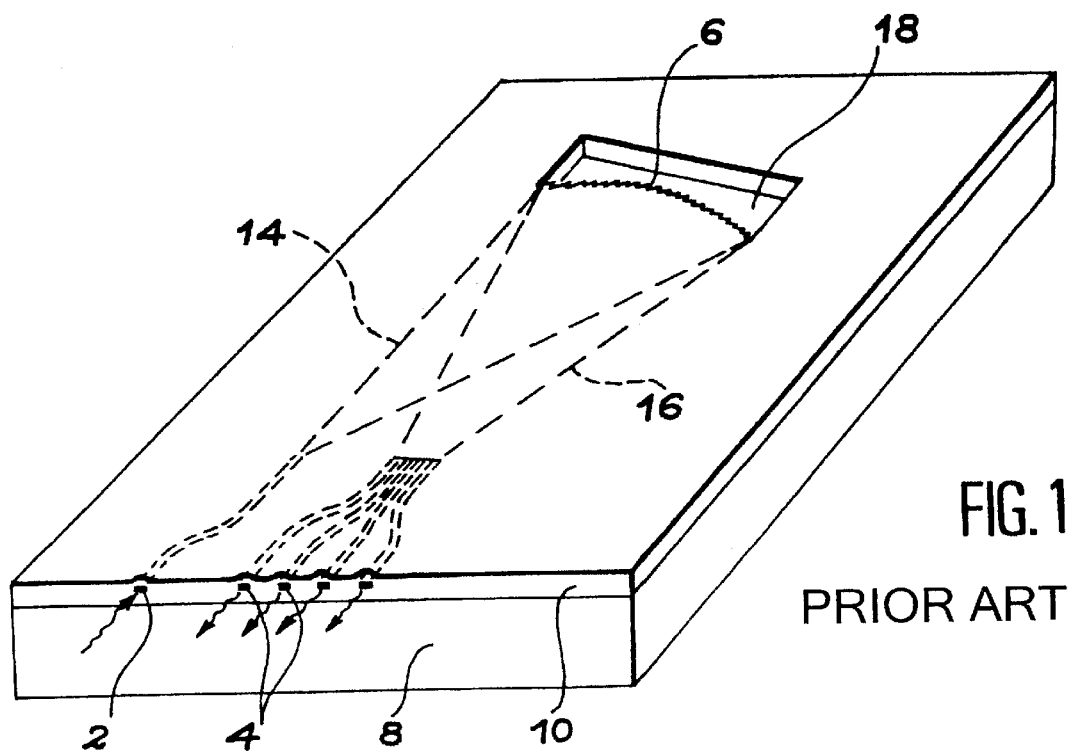
FIG. 1 is a schematic perspective view of a classic micromonochromator made by an integrated optic technique.

FIG. 1 is a schematic perspective view of a known micromonochromator made with an integrated optic technique.

This micromonochromator in FIG. 1 includes a entry optic microguide 2 and several exit optic microguides 4.

It also includes means of diffraction 6 composed of a step grading placed facing the entry and exit microguides as can be seen in FIG. 1 and which functions by reflection.

These microguides 2 and 4 and the diffraction 6 are formed for example on a substrate 8 at the area where there is a set 10 of three layers (two layers of $SiO_2$ and an intermediate layer of $SiO_2$ modified so that it has a refractive index greater than that of the other two layers).

The microguides 2 an d 4 are formed by etching of this intermediate layer (see document (1)).

In the example shown, a demultiplexer with wavelengths $\lambda 1$, $\lambda 2$, $\lambda 3$ and $\lambda 4$ is sought, for example.

The light with these wavelengths is sent into the microguide 2 and demultiplexed by the network 6 provided for this purpose.

Four exit microguides 4 are used to recover respectively wavelengths $\lambda 1$, $\lambda 2$, $\lambda 3$ and $\lambda 4$.

In FIG. 1, reference 14 shows the limits of the optic beam going toward the diffraction mirror and reference 16 shows the limits of the return beam.

A free space 18 has been etched through the set of layers 10 to form the network 6 (see also document (1)).

Figure 2:
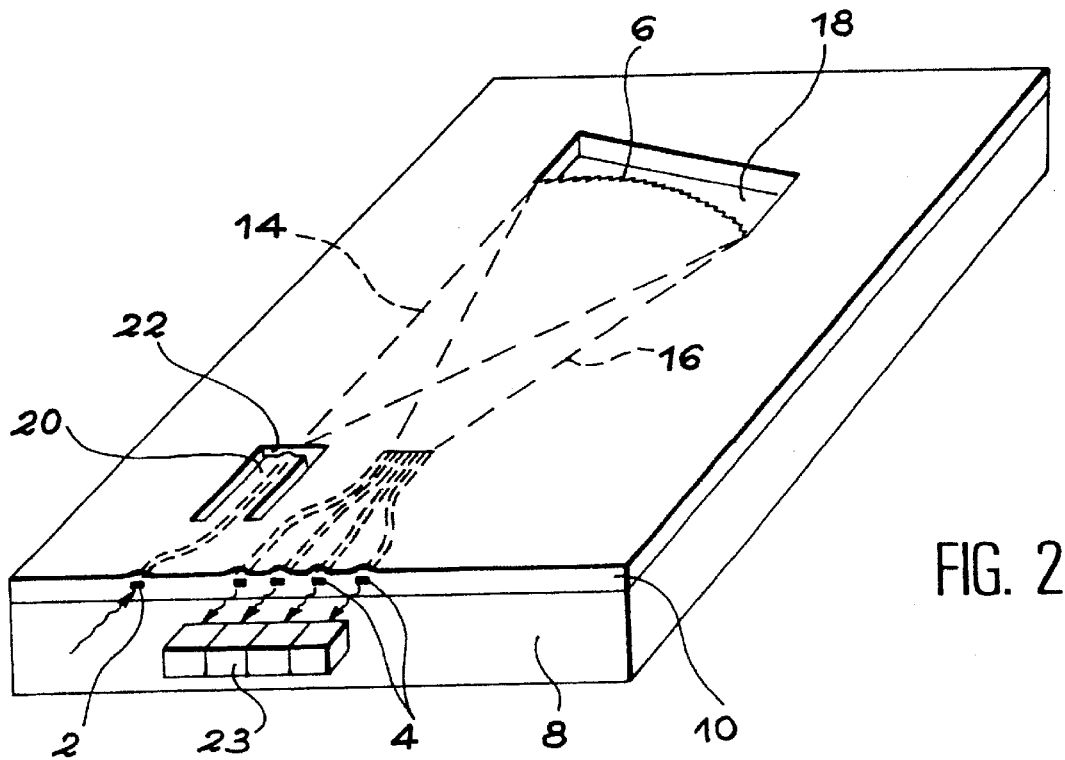
FIG. 2 is a schematic perspective view of a micromonochromator according to the invention, including a mobile beam supporting an entry microguide.

The micromonochromator according to the invention which is schematically represented in perspective in FIG. 2 is identical to the micromonochromator of FIG. 1 except that the terminal part of the microguide 2, which is located facing the network 6, is formed on a mobile beam 20 apt to move in a free space 22 formed across the set of layers 10.

FIG. 2 also shows the means for photodetection 23.

These means for photodetection are to detect the light supplied by each of the exit microguides 4.

The means of control which are not shown such as for example an electrostatic control comb are also placed on the substrate 10 in order to move the mobile beam 20 and thus the extremity of the microguide 2, facing the network 6.

The micromonochromator according to the invention which is schematically shown in perspective in FIG. 3 is identical to that of FIG. 2 except that the exit of this micromonochromator has only one microguide 4 (instead of four as in FIG. 2).

In FIG. 3, the extremity of this microguide 4 is located on the mobile beam 26 which is mobile in a free space formed through the set of layers 10.

The two beams 20 and 26 are identical and parallel as can be seen in FIG. 3.

The means of control allowing for movement of the mobile beam 26 and thus the corresponding microguide 4 are not shown in FIG. 3.

These means of control can also be an electrostatic control comb.

In the case of FIGS. 1 to 5, the microguides 2 and 4 are located on the same side of the substrate 8 and, in the case of FIGS. 3 to 5, the beams are thus also located on the same side of this substrate.

In the case of FIG. 3, the movement of the mobile beam 26 allows for selection of one of the wavelengths demultiplexed by the network 6.

In FIG. 3, the mobile beams 20 and 26 are independent of each other.

In FIG. 4, the mobile beams 20 and 26 are on the contrary rigidly attached to each other.

More precisely, the micromonochromator according to the invention which is schematically shown in perspective in FIG. 4 is identical to that of FIG. 3 except that the beams 20 and 26 are, in the case of FIG. 4, mobile in the same free space 30 formed through the set of layers 10.

In this space 30 there is also a cross bar 32 which is perpendicular to the beams 20 and 26 and which links them, the extremities of these beams being located facing the network 6.

Thus, any movement of one of the two beams implies movement of the other beam.

The means of control for the two beams 20 and 26 are not shown on FIG. 4.

FIG. 5 shows an example of such means of control allowing for movement of the two beams 20 and 26.

These means of control are composed of an electrostatic control comb 34 activated by means which are not shown.

This comb 34 is formed by an integrated optic technique from the set of layers 10.

FIGS. 2 and 5 also show photodetectors 23 for detecting the light supplied by each exit microguide 4.

In FIG. 2, there are four photodetectors whereas in FIGS. 3 to 5 there is a single photodetector 23.

In the case of FIGS. 2 to 5, each photodetector is formed facing the extremities of the exit microguides, opposite the extremities facing the network 6.

Instead of this, there can be a photodetector 36 directly formed on the mobile beam 4, on the side of one extremity of this mobile beam opposite that which is located facing the network 6.

In this case, the exit microguide 4 does not go beyond this beam 26 (when moving away from the network 6).

In one mode of embodiment not shown, the micromonochromator according to the invention includes the entry microguide 2 of which one extremity is located on the mobile beam 20 but does not include any exit microguide.

The microguide(s) are then replaced by one or several photodetectors.

Instead of using a step grading as means of diffraction, a microguide network or PHASAR can be used as illustrated schematically in FIG. 6.

The micromonochromator according to the invention which is schematically represented in an overhead view in FIG. 6 includes such a network of microguides 38.

On one side of it there is an entry microguide 2 of which one extremity is formed on a mobile beam 20 in a free space 22 provided on the substrate.

The means of movement control for this beam are not shown in FIG. 6.

The exit microguides 4 of the micromonochromator are located on the other side of the microguide network 38.

FIGS. 1, 2 and 6 are given as examples with 1 entry and N exits.

There could of course be N entries and 1 exit (in the case of a multiplexer) or N entries and M exits (the mobile means being preferably located on the side of the entries if N<M or the exit side if M<N).

As an example, the multiplexer could correspond to FIG. 2 with the microguide network 4 at the entry and the microguide 2 at the exit, reference 23 corresponding to the various wavelength sources.

Figure 7:
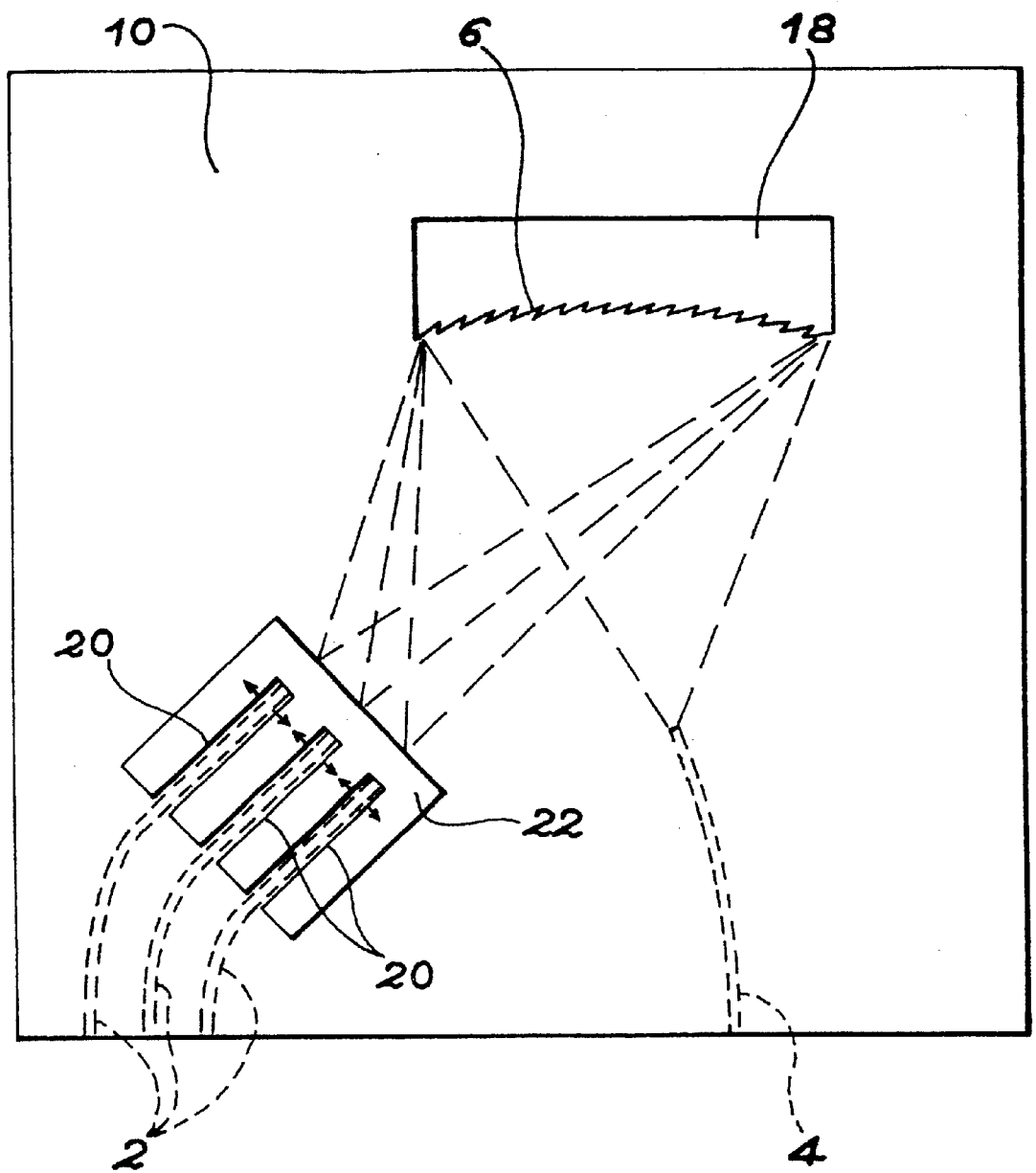
FIG. 7 illustrates schematically a micromonochromator according to the invention including several mobile beams at the entry for example.

FIG. 7 schematically illustrates a micromonochromator according to the invention which includes several mobile beams 20 at the entry for example, each beam being equipped with a microguide 2. A micromonochromator could also be made according to the invention with several mobile beams at the exit (each equipped with a microguide) or even several mobile beams at the entry and exit.

These mobile entry and exit beams can be independent of each other and thus controlled independently of each other (as in FIG. 7) or, on the contrary, they can be rigidly attached to each other and controlled simultaneously. There could even be several mobile beams at the entry and exit, all of these beams being controlled simultaneously (this is illustrated in FIG. 4 in the case of an entry and exit beam).

In addition, any mobile entry beam can be equipped with a source of light placed directly on this beam. Any mobile exit beam can likewise be equipped with a photodetector (as shown schematically in FIG. 3 in the case of a single exit beam).

It should be noted that the use of at least one mobile beam which can sweep that entry and/or the exit continuously is of great value for the invention. Particularly in the case of a multiplexer, such an entry beam allows for multiplexing of any wavelength (as can be seen from FIG. 7), whereas if the mobile beam cannot be continuously varied, only wavelengths determined in advance could be multiplexed. Likewise in the case of demultiplexing, such an exit beam allows for demultiplexing of any wavelength.

What is claimed is:

1. Micromonochromator formed in an integrated substrate and including:
   at least one entry means for light guidance;
   at least one exit means for light guidance;
   means for diffraction, the diffraction means being between the at least one entry means and the at least one exit means and along the light way therebetween, and being integrated in the substrate; and
   mobile means for light guidance, the mobile means being between the at least one entry means and the at least one exit means and along the light way therebetween, and including at least one mobile beam integrated in the substrate and equipped with at least one light guide, the mobile beam being able to sweep the diffraction means in a continuous manner;
   whereby one desired wavelength carried by an optical wave that enters the at least one entry means is recovered in the at least one exit means when the mobile beam is adjusted to a selected position with respect to the diffraction means.

2. Micromonochromator according to claim 1, in which the mobile means of light guidance includes:
   a first mobile means of light guidance associated with the entry of the micromonochromator, and
   a second mobile means of light guidance associated with the exit of the micromonochromator,
   the mobile beam being one of first and second mobile beams, the first and second mobile means of light guidance including, respectively, at least the first mobile beam integrated in the substrate and equipped with at least a first light guide, the first mobile beam being able to sweep the entry in a continuous manner, and at least the second mobile beam integrated in the substrate and equipped with at least a second light guide, the second mobile beam being able to sweep the diffraction means in a continuous manner.

3. Micromonochromator according to claim 2, in which the first and second mobile beams are independent of each other.

4. Micromonochromator according to claim 2, in which the first and second mobile beams are rigidly attached to each other.

5. Micromonochromator according to claim 1, in which the diffraction means includes a multiple-facet mirror.

6. Micromonochromator according to claim 1, in which the diffraction means includes a network of light microguides.

7. Micromonochromator manufacturing process according to claim 1, characterised in that the diffraction means and the mobile means are integrated in the substrate.

8. Micromonochromator formed in an integrated substrate and including:
   at least one entry means for light guidance;
   a plurality of exit means for light guidance;
   means for diffraction, the diffraction means being between the at least one entry means and the plurality of exit means and along the light way therebetween, and being integrated in the substrate; and
   mobile means for light guidance, the mobile means being between the at least one entry means and the plurality of exit means and along the light way therebetween, and including at least one mobile beam integrated in the substrate and equipped with at least one light guide, the mobile beam being able to sweep the diffraction means in a continuous manner,
   whereby one desired wavelength carried by an optical wave that enters the at least one entry means is recovered in a selected exit means of the said plurality of exit means when the mobile beam is adjusted to a selected position with respect to the diffraction means.

9. Micromonochromator according to claim 8, in which the mobile means of light guidance includes:
   a first mobile means of light guidance associated with the entry of the micromonochromator, and
   a second mobile means of light guidance associated with the exit of the micromonochromator,
   the mobile beam being one of first and second mobile beams, the first and second mobile means of light guidance including, respectively, at least the first mobile beam integrated in the substrate and equipped with at least a first light guide, the first mobile beam being able to sweep the entry in a continuous manner, and at least the second mobile beam integrated in the substrate and equipped with at least a second light guide, the second mobile beam being able to sweep the diffraction means in a continuous manner.

10. Micromonochromator according to claim 9, in which the first and second mobile beams are independent of each other.

11. Micromonochromator according to claim 9, in which the first and second mobile beams are rigidly attached to each other.

12. Micromonochromator according to claim 8, in which the diffraction means includes a multiple-facet mirror.

13. Micromonochromator according to claim 8, in which the diffraction means includes a network of light microguides.

14. Micromonochromator manufacturing process according to claim 8, characterised in that the diffraction means and the mobile means are integrated in the substrate.

* * * * *

UNITED STATES PATENT AND TRADEMARK OFFICE
CERTIFICATE OF CORRECTION

PATENT NO. : 6,455,842 B1
DATED : September 24, 2002
INVENTOR(S) : Patrick Pouteau et al.

It is certified that error appears in the above-identified patent and that said Letters Patent is hereby corrected as shown below:

<u>Title page,</u>
Item [56], References Cited, FOREIGN PATENT DOCUMENTS, please delete the following references:

"DE 196 02 584 11/1966
 FR 2 609 180 12/1984"

Signed and Sealed this

Eighteenth Day of February, 2003

JAMES E. ROGAN
*Director of the United States Patent and Trademark Office*